United States Patent [19]

Kumar

[11] Patent Number: 5,629,567
[45] Date of Patent: May 13, 1997

[54] SPEED CONTROL SYSTEM FOR AN AC LOCOMOTIVE

[75] Inventor: Ajith K. Kumar, Erie, Pa.

[73] Assignee: General Electric Company, Erie, Pa.

[21] Appl. No.: 494,873

[22] Filed: Jun. 26, 1995

[51] Int. Cl.[6] .................. B61C 3/00; B60L 3/10; H02P 5/46
[52] U.S. Cl. .................. 290/3; 290/9; 290/45; 318/68
[58] Field of Search .................. 290/3, 45, 9, 14, 290/7; 318/52, 66–72, 449–450, 461, 463, 464; 73/488, 489, 494

[56] References Cited

U.S. PATENT DOCUMENTS

| | | | |
|---|---|---|---|
| 4,418,301 | 11/1983 | Griffith | 318/59 |
| 4,634,887 | 1/1987 | Balch et al. | 290/3 |
| 4,686,434 | 8/1987 | Kojima et al. | 318/52 |
| 5,128,536 | 7/1992 | Higashi | 250/231.16 |
| 5,349,276 | 9/1994 | Mezzatesta, Jr. et al. | 318/268 |
| 5,357,181 | 10/1994 | Mutoh et al. | 318/139 |
| 5,444,340 | 8/1995 | Tamaki et al. | 318/139 |

*Primary Examiner*—Steven L. Stephan
*Assistant Examiner*—Christopher Cuneo
*Attorney, Agent, or Firm*—Jill M. Breedlove; Marvin Snyder

[57] ABSTRACT

A speed control system for an AC electric locomotive of the type having a plurality of wheel-axle sets with each wheel-axle set being coupled to an independently controllable AC electric traction motor and each motor having a corresponding speed sensor, each speed sensor providing a pair of signals which are resolvable to determine the speed and direction of rotation of the associated motor rotor, wherein the control system is arranged for maintaining torque control during failure of one of the signals from an associated speed sensor. The system detects the presence of each of the pair of signals from each speed sensor and responds to detection of only one of the pair of signals from one of the speed sensors for setting motor speed in response to the detected one of the signals. Direction is then determined by using signals from another of the speed sensors.

14 Claims, 5 Drawing Sheets

5,629,567

SPEED CONTROL SYSTEM FOR AN AC LOCOMOTIVE

BACKGROUND OF THE INVENTION

This invention relates generally to electrical propulsion systems for diesel electric locomotives equipped with alternating current electric traction motors and, more particularly, to a method and apparatus for enabling continued operation of the locomotive in the event of a failure of a speed sensor.

In a conventional diesel electric locomotive, a thermal prime mover (typically a 16 cylinder turbo-charged diesel engine) is used to drive an electrical transmission comprising a synchronous generator that supplies electric current to a plurality of alternating current (AC) traction motors whose rotors are drivingly coupled through speed reducing gearing to the respective axle wheel sets of the locomotive. The generator typically comprises a main three-phase traction alternator, the rotor of which is mechanically coupled to the output shaft of the diesel engine. When excitation current is supplied to field windings on the rotating rotor, alternating voltages are generated in three-phase armature windings on the stator of the alternator. These voltages are rectified to produce a controlled amplitude DC voltage and then applied to one or more PWM (pulse width modulation) inverters which control the effective frequency of alternating current to be supplied to the armature windings of the AC traction motors. The effective AC excitation frequency produced by the inverters controls the speed of the AC motors with power being controlled by pulse width modulation of the AC waveform.

In normal motoring; operation, the propulsion system of the diesel electric locomotive is so controlled as to establish a balanced steady state condition wherein the engine driven alternator produces, for each discrete position of a throttle handle, a substantially constant optimum amount of electrical power for the traction motors. In practice, suitable means are provided for overriding normal operations of the propulsion controls and reducing engine load in response to certain abnormal conditions, such as loss of wheel adhesion or a load exceeding the power capability of the engine at whatever engine speed the throttle is commanding. This response, generally referred to as deration, reduces traction power, thereby helping the locomotive recover from such temporary conditions and/or preventing serious damage to the engine.

In addition, the propulsion control system conventionally includes means for limiting or reducing alternator output voltage as necessary to keep the magnitude of this voltage ;and the magnitude of load current from respectively exceeding predetermined safe maximum levels or limits. Typically, both the output voltage of the rectifier connected to the output of the alternator and the output current from the rectifier are monitored with appropriate sensors which provide both a feedback control of the propulsion system operation and also serve to prevent over-voltage and/or over-current conditions. At low locomotive speeds, the traction motor armatures are rotating slowly so that their back EMF is low and requires a low voltage which can be supplied by the PWM inverters. On the other hand, the alternator voltage must be held at higher levels when the locomotive speed is high since the traction motors are rotating rapidly and require a higher voltage.

Each AC motor of a locomotive is coupled to drive a separate wheel-axle set and each motor is provided with controlled power from a corresponding one of a plurality of PWM inverters. The inverters are controlled from respective ones of a corresponding plurality of process controllers such as, for example, a microprocessor based control unit. While one control unit could be used to regulate operation of all inverters, multiple independent control units are desirable to provide redundancy, i.e., to allow the locomotive to operate under at least some amount of power in the case of failure of one or more control units. The control units rely on feedback signals from the motors for setting the appropriate power to each motor and to detect such undesirable events as a wheel slip/slide condition. Such feedback is commonly provided by motor or wheel speed sensors such as a tachometer coupled to the motor rotor or geared to the wheel-axle set.

In general, a preferred form of tachometer produces at least two signals which can be resolved in older to determine both wheel speed and direction of rotation. One such tachometer produces a pair of phase displaced signals, typically square wave signals, in which the frequency of each signal is representative of motor or wheel speed and the phase displacement between the signals provides an indication of the direction of rotation. With this form of tachometer, either signal can be resolved to provide speed information but both signals are needed to provide an indication of rotation direction. A problem arises whenever one of the signals fails, usually by a short-circuit, open circuit or an intermittent one of these events. If both signals are lost, the lack of feedback information requires shutting down of the AC drive associated with the failed tachometer. Since a common failure is loss of only one of the pair of signals, it is desirable to provide a method and apparatus to allow continued operation when one such signal is lost.

SUMMARY OF THE INVENTION

Among the several objects of the present invention may be noted the provision of a propulsion control system for a diesel electric locomotive utilizing AC traction motors in which the propulsion system includes apparatus for sensing a failure of the speed monitoring means; the provision of an improved propulsion control system for an AC locomotive which allows the locomotive to continue to operate in the event of a partial failure of the speed monitoring means; and, the provision of a locomotive propulsion control system which can be automatically modified to inhibit use of a failed speed monitor signal and allow continued operation of the AC locomotive.

In an illustrative form, the invention is implemented in a locomotive propulsion control system having voltage and current monitoring means for determining power output from an onboard power system and having speed feedback means for allowing the control system to establish a power level to maintain a desired speed and to detect and inhibit wheel slip/slide conditions. The power output of the power system is determined by multiplying the voltage output of the power system by its current output. The resultant product is proportional to power and is used to regulate the amount of power supplied to alternating current electric traction motors connected in driving relationship to wheel axle sets of the locomotive. More particularly, the measured output power of the power system is compared to a commanded power reference signal, which power reference signal is determined from an operator's command by position of a throttle. The difference between the measured power and the commanded power results in an error signal which is supplied to a proportional plus integral regulator and then summed with the commanded power signal to produce a power command for controlling the amount of power supplied to the electric traction motors. Conventionally, the power signal is divided by motor speed to yield a torque command so that the amount of power available to the electric traction motors is determined as a function of speed. More particularly, at low speeds, the torque command allows higher currents to be applied to the motors to generate higher torque for starting the locomotive whereas at higher speeds, the amount of power can be reduced to maintain the available torque at a lower level needed for constant speed operation. Each motor speed feedback is used by the inverter control to control the flux and torque produced by each motor. This is achieved by controlling voltage and frequency based on the speed and torque required. The frequency is generally obtained by adding speed, including direction, and required slip. In the event of a failure of the speed feedback means, the inverter cannot control the torque or determine a direction of rotation of the motor. In such event, the system determines if only one of a pair of signals from the speed feedback means has failed and if so, uses the non-failed signal for speed feedback and relies on signals from other wheel-axle sets to determine direction. If both speed feedback signals are lost, the system for the associated motor shuts down.

In one form, the speed sensor output is continuously monitored to determine if the speed sensor is properly operating. For example, the phase shifted signals from the speed sensor or speed feedback means are used to alternately set and reset a logic circuit. If a second signal is received for setting the logic circuit before a reset has occurred, one of the pair of signals is determined to have failed. Conversely, if a second reset signal is received prior to an intervening set signal, one of the signals has failed. The system then evaluates each signal to determine which has failed and thereafter substitutes the non-failed signal for use as an indicator of motor speed. Motor rotation is then determined by reference to a signal from another wheel-axle set. If separate control processors are used for each motor, the processors are linked by a serial data bus so that each processor receives data from the other processors indicating at least the direction of rotation of the respective motors.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
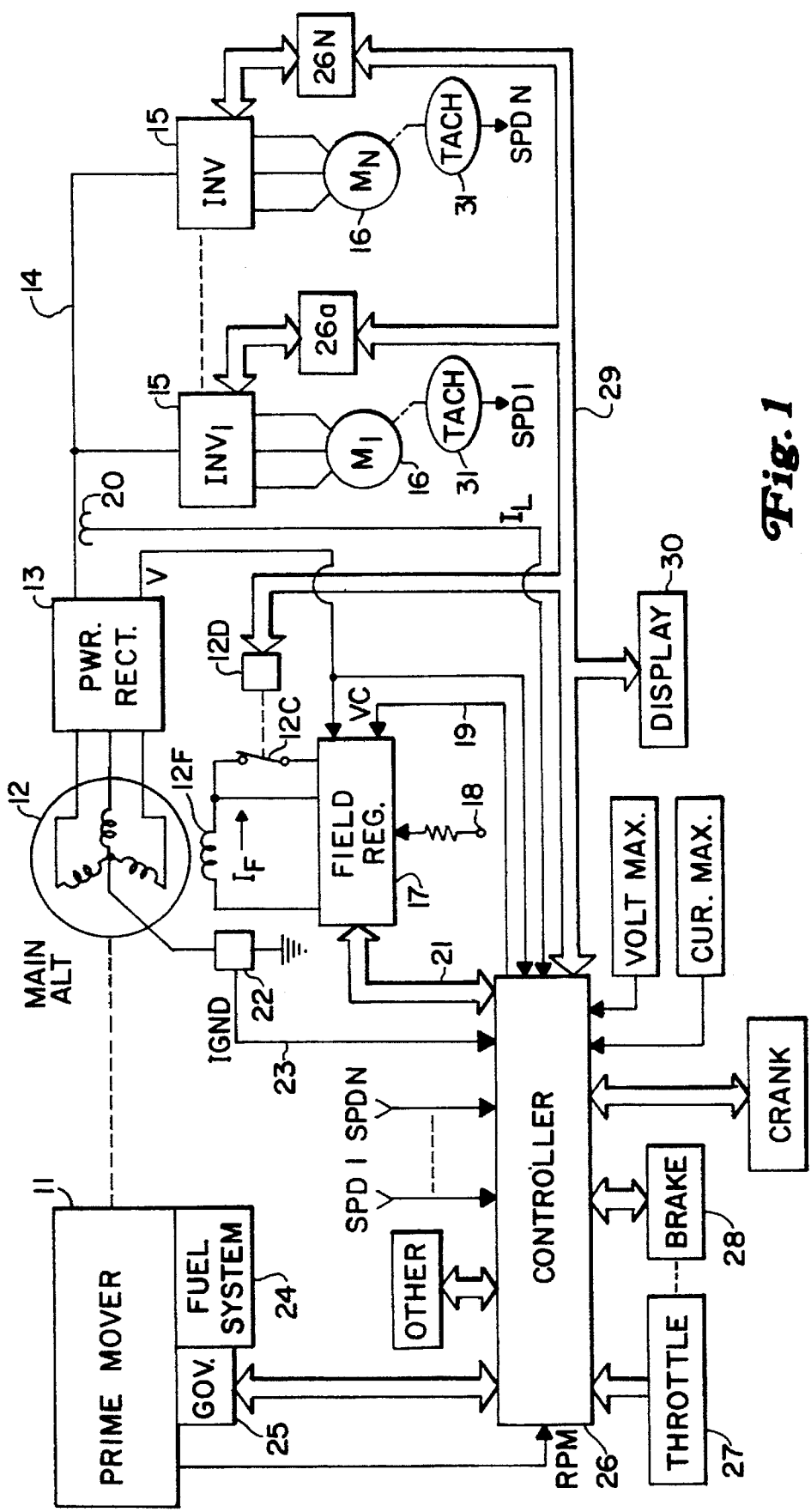
FIG. 1 is a simplified block diagram of an electrical propulsion system for a diesel electric locomotive.

The propulsion system shown in FIG. 1 includes variable speed prime mover 11 mechanically coupled to the rotor of a dynamoelectric machine 12 comprising a three-phase alternating current (AC) synchronous generator, also referred to as a main traction alternator. The main alternator 12 has a set of three star connected armature windings on its stator. In operation, it generates three-phase voltages in these windings, which voltages are applied to AC input terminals of at least one three-phase double-way uncontrolled power rectifier bridge 13. In a conventional manner, the bridge 13 is formed by a plurality of pairs of power diodes, each such pair of diodes being associated with each of the three different phases of the main alternator 12. The diodes in each pair are serially connected between relatively positive and negative direct current (DC) output terminals of the rectifier bridge, and their junction is connected by a protective fuse (not shown) to the respectively associated AC input terminal of the bridge. The output of the bridge 13 is electrically coupled, via DC bus 14, in energizing relationship to a plurality of parallel connected, electrically controllable inverters 15, only two of which are shown in the illustrated embodiment. The inverters 15 are conventional three-phase pulse width modulated (PWM) inverters having a plurality of pairs of controllable rectifiers connected in such a manner that by controlling the time at which each of the rectifiers is gated into conduction one is allowed to control the output frequency voltage and power supplied by the inverters. The three-phase outputs of the inverters are connected to corresponding ones of the adjustable speed AC traction motors 16. Prime mover 11, alternator 12 and rectifier 13 are suitably mounted on the platform of a self-propelled 4-axle or 6-axle diesel electric locomotive. A locomotive platform is in turn supported on two trucks (not shown), each having two or more wheel axle sets. A separate one of the traction motors 16 is hung on each axle and its rotor is mechanically coupled via conventional gearing in driving relationship to the associated axle wheel set. Suitable current sensing means 20 is coupled to the DC bus 14 to provide a current feedback signal IL that is representative of the magnitude of current supplied by the power rectifier 13.

The main alternator 12 of the power rectifier 13 serves as a controllable source of electric power for the traction motors. The magnitude of output voltage or current of the source is determined and varied by the amount of excitation current supplied to field windings 12F on the rotor of the main alternator. These field windings are: connected for energization to the output of a suitable source 17 of regulated excitation current IF. In the illustrative embodiment of the invention, the connection between the field windings 12F and the excitation current source 17 includes a contact 12C of a conventional electromechanical field switch. The field switch has control means 12D for moving it to a first or normal state in which the contact 12C is closed and freely conducts excitation current and for causing the switch to change between its first state and its second or alternative state in which the contact 12C is open and excitation current is effectively interrupted.

The excitation current source 17 may comprise a three-phase controlled rectifier bridge having input terminals 18 which receive alternating voltage from a prime mover driven auxiliary alternator that can actually comprise an auxiliary set of three-phase armature windings on the same frame as the main alternator 12. This source 17 is labeled field regulator in FIG. 1. It includes conventional means for varying the magnitude of direct current IF supplied to the alternator field 12F (and hence the output of the alternator 12) as necessary to minimize any difference between the value of a variable control signal VC on an input line 19 and a feedback signal which during motoring is representative of the average magnitude V of the rectified output voltage of the main alternator 12. The voltage V is sensed by a conventional voltage sensing module (not shown) connected across the DC output terminals of the power rectifier.

The current detecting or current monitoring means 20 is connected to monitor the current on the bus 14 supplied to the inverters 15. The monitor 20 provides a feedback signal representative of the magnitude of current supplied by the power rectifier 13 to the motors 16.

The prime mover 11 that drives the alternator field 12F is a thermal or internal combustion engine or equivalent. On a diesel electric locomotive, the motive power is typically provided by high horsepower, turbo-charged, 16 cylinder diesel engine. Such an engine has a fuel system 24 that includes a pair of fuel pump racks for controlling how much fuel oil flows into each cylinder each time an associated fuel injector is actuated by a corresponding fuel cam on engine cam shafts. The position of each fuel rack, and hence the quantity of fuel supplied to the engine, is controlled by an output piston of an engine speed governor system 25 to which both racks are linked. The governor regulates engine speed by automatically displacing the racks, within predetermined limits, in a direction and by an amount that minimizes any difference between actual and desired speeds of the engine crankshaft. The desired speed is set by a variable speed call signal received from an associated controller 26, which signal is herein called speed command signal or the speed call signal. An engine speed signal (RPM) indicates the actual rotational speed of the engine crankshaft and hence the alternator field. The speed command signal for the engine governor system 25 and the excitation control signal VC for the alternator field current source 17 are provided by the controller 26. In a normal motoring or propulsion mode of operation, the values of these signals are determined by the position of a handle of a manually operated throttle 27 to which the controller 26 is electrically coupled. A locomotive throttle conventionally has eight power positions or notches (N) plus idle and shutdown. N1 corresponds to a minimum desired engine speed (power), while N8 corresponds to maximum speed and full power. With the throttle in its idle position, the controller 26 is operative to impose on the control signal VC a value corresponding to IF=0, and no traction power is produced by the main alternator 12. When the electrical braking of a moving locomotive is desired, the operator moves the throttle handle to its idle position and manipulates an interlocking handle of a companion brake control device 28 so that the main controller 26 is now supplied with a variable "brake call" signal. The controller sets up the alternator for minimum voltage. The AC motor will then build up flux and act as a generator. The amount of braking torque is then controlled by controlling the slip frequency of the AC motor by control of conduction of the inverted switching devices. In a consist of two or more locomotives, only the lead unit is usually attended, and the controller on board each trail unit will receive, over train lines, encoded signals that indicate the throttle position or brake call selected by the operator in the lead unit.

For each power level of the engine there is a corresponding desired load. The controller 26 is suitably arranged to translate the notch information from the throttle 27 into a reference signal value which establishes a voltage output from the alternator required by the motors in order to generate the torque or power being called for by the notch position. For this purpose, and for the purpose of deration (i.e., unloading the engine) and/or limiting engine speed in the event of certain abnormal conditions, it is necessary to supply the controller 26 with information about various operating conditions and parameters of the propulsion system, including the engine.

As illustrated in FIG. 1, the controller 26 receives the above-mentioned engine speed signal RPM, voltage feedback signal V, and current feedback signal IL which is representative of the magnitude of current supplied to the motors 16. The controller also receives a load controlled signal issued by the governor system 25 if the engine cannot develop the power demanded and still maintain the called for speed. The load control signal is effective, when issued, to reduce the power reference value in the controllers 26 so as to weaken the alternator field until a new balance point is reached. Additional data supplied to the controller 26 includes "volt max" and "cur max" data that establish absolute maximum limits for the alternator output voltage and current respectively. The controller also receives "crank" dam indicating whether or not an engine starting or cranking routine is being executed and relevant inputs from other selected sources, as represented by the block labeled "Other". The alternator excitation source 17 and the controller communicate with each other via a multi-line serial data link or bus 21. The controller 26 also communicates with the control means 12D that is operative, when energized in response to a "close" command from the controller, to move the field switch contact 12C to its closed position.

In the preferred embodiment of the invention, the controller 26 comprises a microcomputer. A person skilled in the art will understand that a microcomputer is actually a coordinated system of commercially available components and associated electrical circuits and elements that can be programmed to perform a variety of desired functions. In a typical microcomputer, a central processing unit (CPU) executes an operating program stored in an erasable and electrical reprogrammable read only memory (EPROM) which also stores tables and data utilized in the program. Contained within the CPU are conventional counters, registers, accumulators, flip-flops (flags), etc. along with a precision oscillator which provides a high frequency clock signal. The microcomputer also includes a random access memory (RAM) into which data may be temporarily stored and from which data may be read at various address locations determined by the program stored in the EPROM. These components are interconnected by appropriate address, data and control buses, one of such buses being indicated at 29 and shown connecting signals from the controller 26 to the inverters 15, the control switch 12D and a display 30. The microprocessor used in the controller 26 may be a conventional processor of the type available from Intel Corporation or of the alternative type available from Motorola, Inc. Furthermore, while the controller 26 is capable of controlling each of the inverters 15, it is desirable to provide a distributed process control arrangement in which the individual inverters are controlled by process controllers 26A–N, where N represents the number of inverters 15. Each controller 26A–N is coupled to each other controller by the serial data link or bus 29 so that each controller has access to at least speed feedback data from the other controllers. In the distributed system, many of the functions previously performed by controller 26 are implemented at the local level by controllers 26A–N. More particularly, the torque calculations and gate turn-on, turnoff times of the switching devices in inverters 15 are implemented at controllers 26A–N. For ease of description, it will be presumed that a single controller 26 performs all torque and switching commands.

The controller 26 is programmed to produce, in the motoring mode of operation, a control signal value on the line 19 that varies as necessary to zero any error between the value of the alternator voltage feedback signal V and a reference value that normally depends on the throttle position selected by the locomotive operator and the tradition power output of the main alternator. One method for implementing this control function is disclosed in U.S. Pat. No. 4,634,887. In order to implement an electrical braking mode of operation, the controller 26 is programmed to vary the conduction of the switching devices in the inverters in a manner to vary or control the slip frequency of the AC motors. The controller 26 also provides the signals necessary to control the timing of the firing of the rectifier devices within the inverters 15 in such a manner as to establish a desired frequency of operation of the power supplied by the inverters 15 to the motors 16 so as to control the speed of the locomotive. Suitable feedback means are also provided from the wheel axle sets of the locomotive by means 31 which may be conventional tachometers providing signals SPD to the controller 26. Conventionally, each wheel axle set may be associated with a separate tachometer or speed sensor to provide multiple signals indicative of speed and direction of rotation to the controller so as to be able to obtain synchronous frequency to control torque and to be able to detect wheel slip or slide conditions.

While the above description of the controller 26 implies that the controller is strictly a voltage or current regulator, it will be appreciated that the conventional controller while regulating voltage and current output of the alternator 12 typically utilizes calculations of the actual power delivered to the motors 16 and by the actual horsepower or torque developed by the motors 16. Power and torque are quantities that are calculated within the controller 26 from the values of voltage and current supplied to the motors. Furthermore, each motor may also be supplied with flux sensing windings to enable a direct measurement of horsepower being developed within the motors by measurement of motor flux or, in a preferred form, the terminal voltage and motor current is measured and used to estimate the horsepower developed by the motors. Torque or tractive effort can be estimated from the integral of voltage multiplied by current. However, calculation of torque is generally derived by dividing power by speed.

Figure 2:
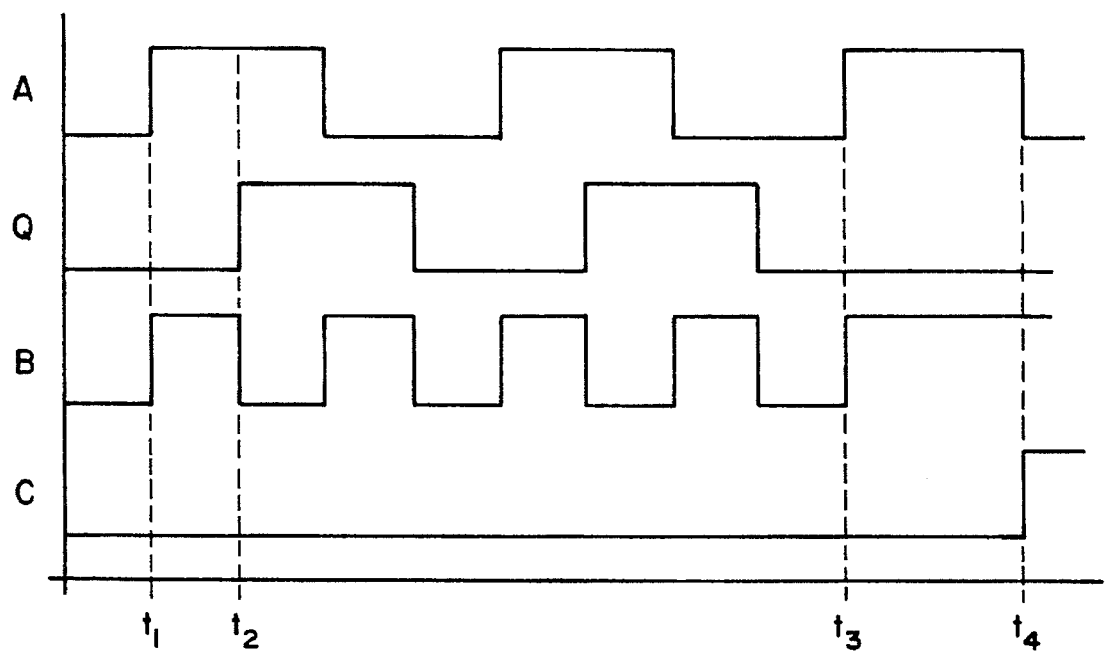
FIG. 2 illustrates conventional A and Q output waveforms from a tachometer and a resolved waveform for establishing direction with a further waveform for a high Q failure.

In typical practice, the speed sensor feedback signals from the speed tachometers 31 are applied to the controllers 26 or to the individual controllers 26A–N where those signals are resolved to determine speed and direction of motor rotation and to control torque. Speed sensor signals are also utilized in flux regulation and to detect wheel slip or slide. In order to understand the operation of the signals from the tachometers 31, reference is now made to FIG. 2 which shows a typical pattern of the phase-shifted signals A and Q from each of the tachometers 31. Note that the signals A and Q are substantially identical but merely phase-shifted by 90 degrees electrically, i.e., they are quadrature or "quad" signals. These two signals can be applied to a logic circuit such as for example a flip-flop in which the signal A is used to cause the flip-flop to transition to a set position as shown by the signal B. Subsequently, a Q signal can be applied to reset the flip-flop. Note that at time t1, the signal A sets the flip-flop and the subsequently occurring signal Q at time t2 resets the flip-flop. At time t3, the signal A transitions to a high state again setting the flip-flop as shown at signal B. However, the signal Q has failed and therefore at time 14 when signal A reverts to a logical zero state, the signal B is still in a logical one state: and a failure is indicated by the transition of a signal C. The signal C can be generated in various ways by logic circuits connected to monitor the state of the signals A and Q and B to determine when a failure has occurred. The particular pattern illustrated in FIG. 2 is that which occurs when the Q signal fails to a low state. A similar type of analysis can be performed for determining if the Q signal fails in a high state.

Figure 3:
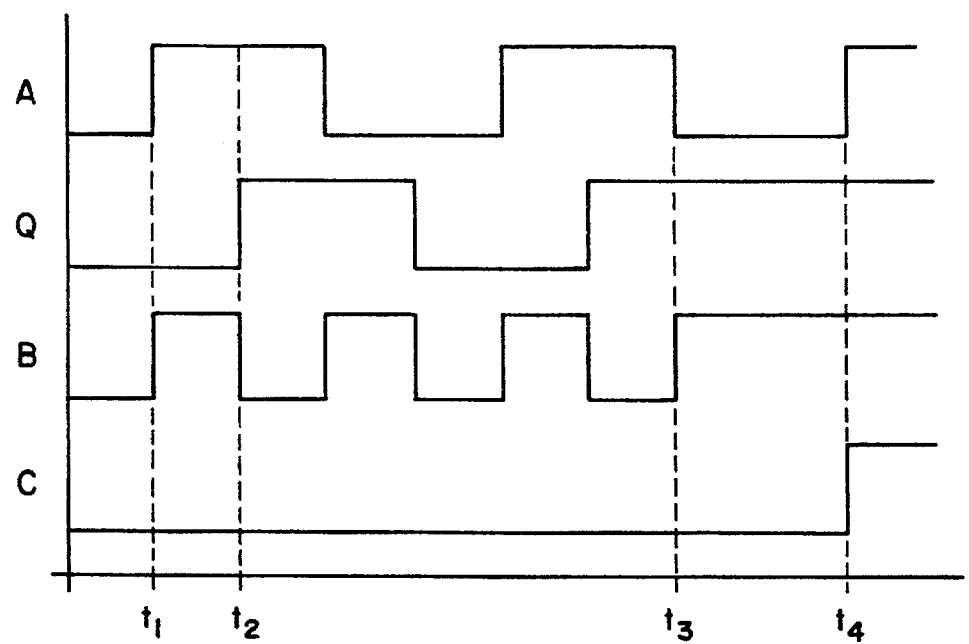
FIG. 3 is substantially identical to FIG. 2 but with a low Q failure.

Referring now to FIG. 3, there is shown a pattern of signals corresponding to the signals of FIG. 2 but in which the Q signal fails to a high state. Note that here again, the B signal is in a high state at the time that the subsequent transition of the A signal occurs so that the C signal perceives the same conditions as was noted with regard to FIG. 2, i.e., the A signal transitions at time 14 while the B signal is still in a logical one state. Accordingly, the C signal transitions from a logical zero to a logical one state again indicating a failed Q situation.

Figure 4:
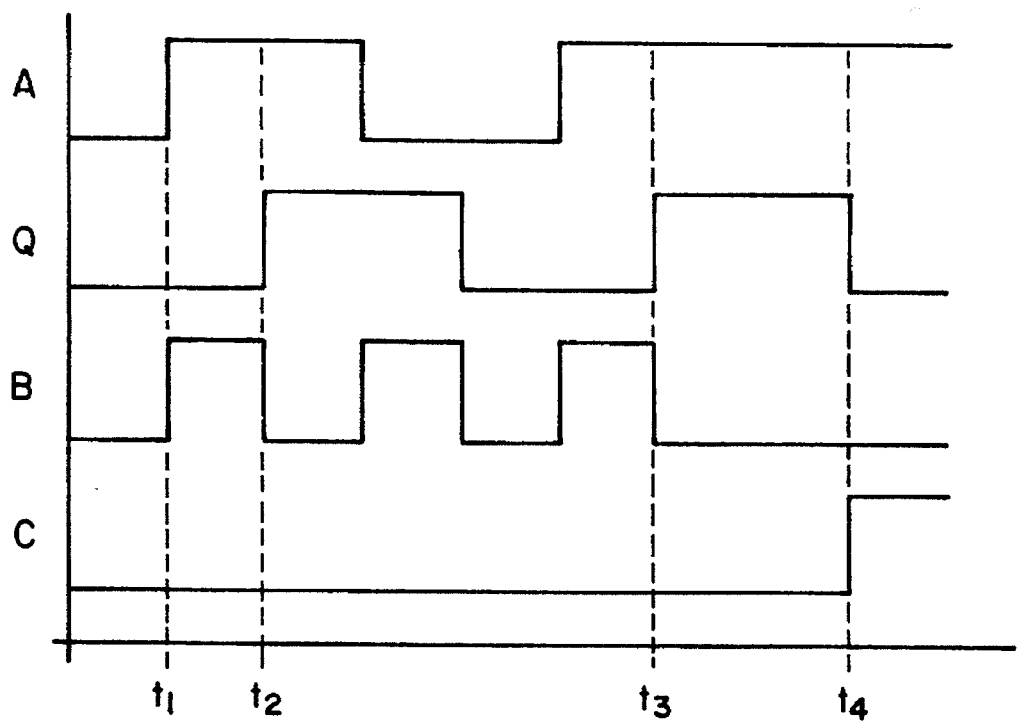
FIG. 4 illustrates the waveforms of FIG. 2 with a high A failure.

The opposite type of failure is for the A signal to fail in either a high or low state. Referring now to FIG. 4, there is shown a condition in which the A signal fails in a high state. Note that at time t3, the Q signal transitions to its high state in a normal manner causing the B signal to transition to a low state. Subsequently at time t4, the Q signal transitions to a low state but the A signal has remained high. Accordingly, the B signal remains in a low state so that the C signal transitions from a low to high state to indicate a failed condition. Another possible failure of course is that the A signal may fail to a low state rather than a high state but the same analysis of the signals applies as was shown with regard to the Q signal. The C signal will again transition from a low to a high state to indicate a failure of the A signal.

Figure 5:
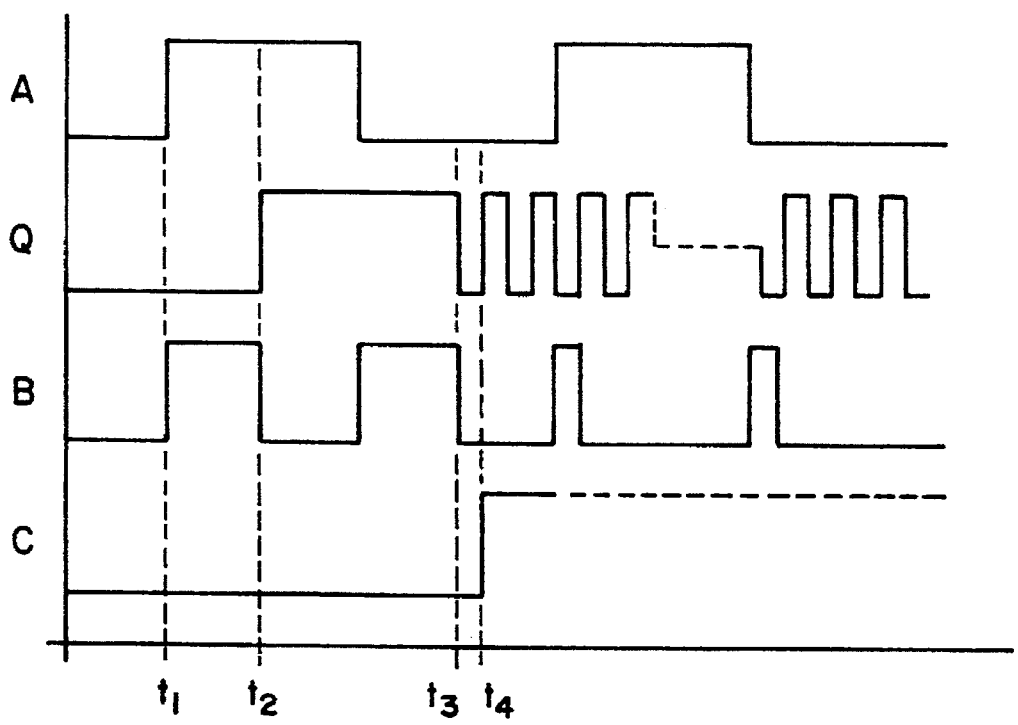
FIG. 5 illustrates the waveforms of FIG. 2 with an intermittent or high frequency Q failure.

Still another type of failure is illustrated in FIG. 5 in which the Q signal suddenly fails into a high frequency mode which may occur because of an intermittent circuit condition or because the Q signal has picked up some other form of oscillation. Note that here again the transitions of the Q signal will occur before the A signal again transitions so that the system will detect a transition failure. The one difference in this scenario is that the system will likely indicate a failure of the A signal rather than a Q signal failure so that further evaluation of the signals may be necessary. One method of performing this evaluation is to include a timing signal to determine if the Q signal is transitioning at a rate different than that of the A signal.

Figure 6:
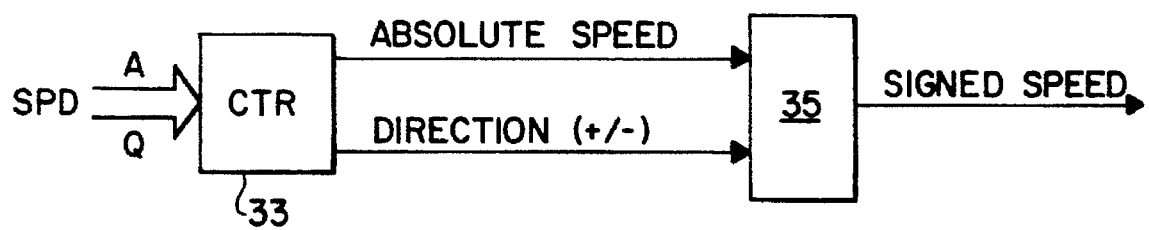
FIG. 6 is a simplified block diagram showing conventional system operation from an operational tachometer.

Referring now to FIG. 6, there is shown a normal operation of the conventional system in which the speed sensor provides A and Q signals to a counter circuit 33. The counter circuit 33 in turn provides two signals out, one of which indicates absolute speed and the other of which indicates direction of rotation. Absolute speed is determined from counting either the A or Q signals as a function of time in a well known manner. Direction of rotation is determined by comparing the A and Q signals and determining which are the leading and trailing signals. These signals are then applied to a circuit 35 which develops a signed speed signal. For example, the speed signal may be a positive value if the motor is rotating in a forward direction and a negative value if the motor is rotating to drive the locomotive in a reverse direction.

Figure 7:
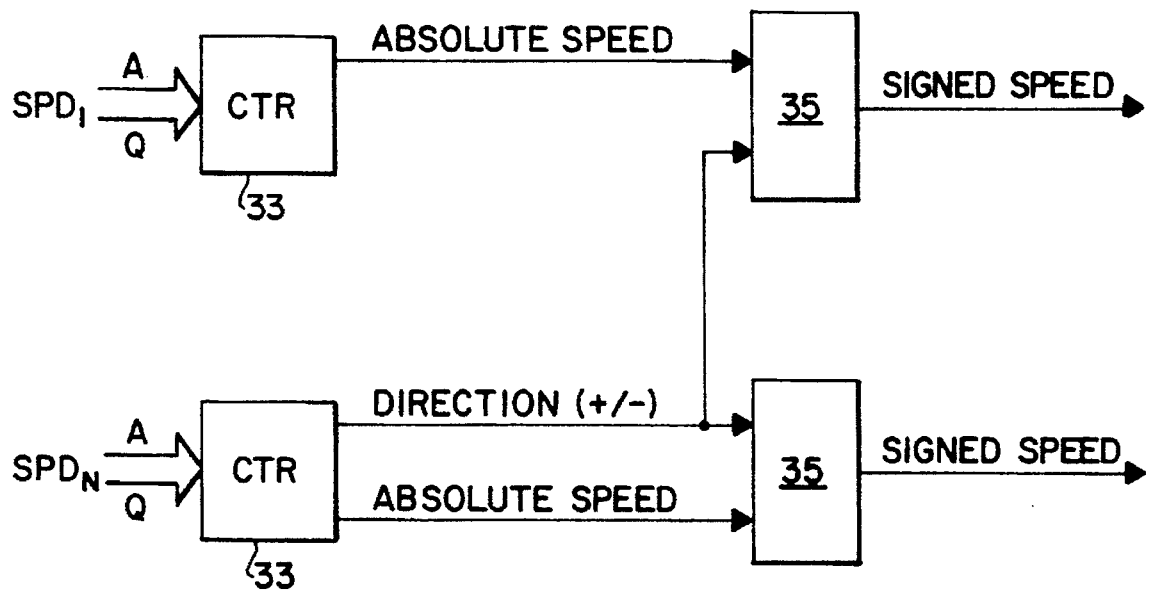
FIG. 7 is a simplified block diagram showing system operation in the event of failure of one of the A and Q outputs from a tachometer.

FIG. 7 indicates a modification of the operation of the circuit of FIG. 6 under conditions in which it has been detected that at least one of the A and Q signals from an associated speed sensor has failed. Here the counter circuit 33 is unable to provide the direction signal but because one of the signals A and Q is valid can supply a signal proportional to absolute speed. The local process controller 26A–N then selects from the serial data bus 29 a direction signal derived from other speed sensors or tachometer 31 in the system and uses that direction signal to apply the proper signed value to the output speed signal from the logic circuit 35.

The timing diagrams of FIGS. 2–5 illustrate some of the possible modes of failure of the A and Q signals. As will be apparent, various logical processes can be applied to determine if a signal has failed. For example, referring to FIG. 2, if the A signal transitions from one state to another state and the B signal does not transition, a failure of the Q signal has occurred. In FIG. 4, a transition of the Q signal without a corresponding transition of the B signal indicates a failure of the A signal.

Figure 8:
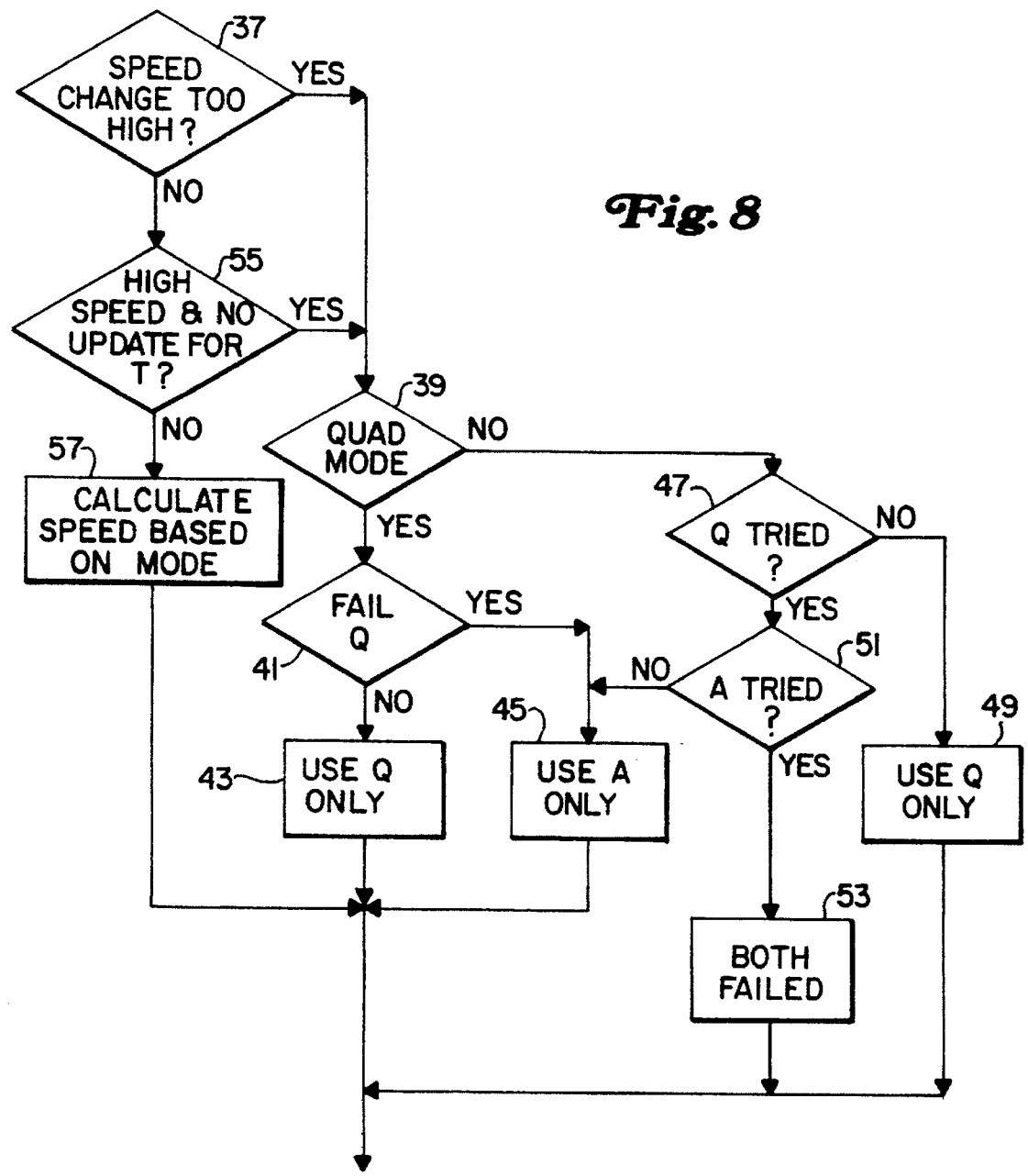
FIG. 8 is a flow chart for a program implemented to identify tachometer failure and to convert from normal operation to the system operation of FIG. 7.

Referring now to FIG. 8, there is shown a logic circuit which is implemented within the local controllers 26A–N for determining the status of the A and Q signals from the respective ones of the tachometers 31. As shown at block 37, the first test is to determine whether the speed signal which has been received is indicative of too high a speed change. For example, it is normally assumed that the locomotive cannot change speed at a value greater than about four miles per hour. If the indicated speed change is greater than the preselected high value, the system transitions to block 39 to determine whether there has been a prior failure detection. A prior failure detection would result in the associated controller using the speed signal from only one of the A and Q outputs. If it is determined that there has been no prior failure and the system is in a quad mode signal condition (both A and Q signals operational), the system then checks the Q signal for failure. If the Q signal has not failed, the system transitions to block 43 and uses the Q signal for speed control. If the system at block 41 determines that the Q signal has failed, the system transitions to block 45 using the A signal only for speed control. In these two cases of blocks 43 and 45, only the speed is determined from one of the signals A and Q and the direction signal is then determined from information obtained over the serial data link 29 from other speed sensors 31. Note that the block 41 may rely on the logical analysis of the A and Q signals in the manner described above with regard to FIGS. 2–5, i.e., block 41 checks the status of the "C" signal to determine a failure of the "Q" signal.

Turning back to block 39, if it is determined that the system has not been in a quad mode, i.e., one of the A and Q signals are not operative, the system then checks to see if the Q signal has been tried, block 47. If the Q signal is determined not to have been tried, the system transitions to block 49 and uses the Q signal for speed indication. If the Q signal has tried, the system transitions to block 51 and evaluates the A signal status. If the A signal has not been tried, the system transitions to block 45 and uses the A signal. If the A signal has been tried, then both A and Q are in a failed state as indicated at block 53, and the motor associated with the particular speed sensor is taken off line.

Returning again to block 37, if the speed change signal is not above the maximum allowed speed change, the system transitions to block 55 to determine if the system is operating at a high speed mode and no update of speed information has been received within a predetermined time T, for example, 100 milliseconds. If such information has not been received, the system transitions to block 39 and proceeds as described above to determine if there has been a signal failure. If the information has been received, the system translates down to block 57 and calculates speed based upon the locomotive mode of operation, i.e., forward or reverse, in a normal manner and provides that information to the torque regulator to control the voltage and current applied to the motors 16 so as to generate the desired torque by the motors. As discussed above, the controller 26 (or separate controllers 26A–N) are microcomputer type controllers and: the functions illustrated in FIG. 8 are implemented in software. Typically, the routine of FIG. 8 will run frequently, for example, every 3 milliseconds. The processes implemented in blocks 37 and 55 rely on speed calculations by controller 26. In particular, in a quadrature mode, the "B" signal is used to determine speed with a speed calculation being performed at each transition of the B signal. Noise or other oscillations on the A or Q signal lines can result in early or late transitions in the B signal giving rise to an unrealistic speed change detected at block 37. Failure of either the A or Q signal will result in a loss of updated information since the transition of the B signal will not occur. If the transition does not occur within the time T, block 55 detects the failure.

Referring again to block 39, the system normally operates in a quad mode using the B signal to determine speed. If the system is not in a quad mode, which would occur when there has been a prior failure of either an A or Q signal, the system then has to determine whether the A or the Q signal have been previously tried, blocks 47 and 51. If both have been tried and since the error still exists, then both have failed. If only one has been tried, the other is then tried to see if valid speed calculations can be performed. If this is a new failure and the system is in a quad mode, block 41 determines if the Q signal is valid and then selects A or Q depending on that determination.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A speed control system for an alternating current (AC) electric locomotive, the locomotive including a plurality of wheel-axle sets with each wheel-axle set being coupled to an independently controllable AC electric traction motor, each traction motor having a corresponding speed sensor and each speed sensor providing a pair of signals which are resolvable to determine the speed and direction of rotation of the associated motor rotor, the speed sensor signals being coupled to process control means which controls power to the motors, said system comprising:

means for detecting the presence of each of the pair of signals from each speed sensor;

means responsive to detection of only one of the pair of signals from one of the speed sensors for setting motor speed in response to the detected one of the signals; and means for using signals from another of the speed sensors for establishing motor rotational direction for the motor coupled to said one of the speed sensors.

2. The system of claim 1 wherein the process control means comprises a plurality of substantially independent process controllers, each of the process controllers being coupled for controlling power to a respective one of the motors, said system including a data communication bus interconnecting the process controllers for supplying data representative of the direction of rotation of each motor to the controllers associated with other motors.

3. The system of claim 1 and including means for detecting invalid data from one of the pair of signals and disabling use of said data.

4. The system of claim 1 and including means for disabling operation of the motor in response to a failure of each of the pair of signals from a corresponding speed sensor.

5. The system of claim 3 and including means for using valid data from another of the pair of signals for indicating motor speed.

6. A method for maintaining torque control of an alternating current electric motor coupled in driving relationship to wheels of a vehicle, the vehicle including other motors coupled for driving other wheels of the vehicle with each motor associated with it corresponding speed sensor, the method comprising the steps of:

generating a pair of quadrature signals from each speed sensor wherein the phase relationship between the signals is indicative of a direction of motion of the vehicle;

resolving the pair of signals to develop a third signal representative of speed of the vehicle for each speed sensor;

comparing the pair of signals and the third signal to detect a failure of one of the pair of signals in any one of the speed sensors; and using, in response to detection of a failure of one of the pair of signals, another of the pair of signals to determine speed for the one of the speed sensors.

7. The method of claim 6 and including the step of comparing the phase relationship between the pair of signals to determine direction of motion.

8. The method of claim 7 and including the step of obtaining a signal developed from another of the speed sensors to determine vehicle direction of motion for the one of the speed sensors.

9. The method of claim 6 and including the further steps of:

comparing the speed represented by said third signal at consecutive sample intervals and providing an error signal when the step of comparing indicates a speed change, greater than a preselected maximum value;

evaluating, in response to the error signal, the status of at least one of the pair of signals to identify a failure of the at least one of the pair of signals; and using the at least one, of the pair of signals to determine speed of the vehicle when the step of evaluating identifies the status of the at least one of the pair of signals as operational.

10. The method of claim 9 and including the further step of:

using, when the step of evaluating indicates a failure of the at least one of the pair of signals, the other of the pair of signals to determine speed of the vehicle.

11. The method of claim 10 and including the additional step of terminating operation of the associated motor in response to a detected failure of both of the pair of signals.

12. The method of claim 10 and including the step of obtaining a signal developed from another of the speed sensors to determine vehicle direction of motion for the one of the speed sensors.

13. The method of claim 12 wherein the steps of using the at least one of the pair of signals and using the other of the pair of signals occurs in sequential order in response to consecutive detections of speed error data from said step of comparing.

14. The method of claim 13 wherein the step of comparing includes the step of indicating a compare failure in response to non-receipt of a speed update in less than a preselected time interval.

* * * * *